US006408867B2

(12) United States Patent
Aoki et al.

(10) Patent No.: US 6,408,867 B2
(45) Date of Patent: Jun. 25, 2002

(54) FUEL CUTOFF VALVE AND FUEL TANK

(75) Inventors: Tomohide Aoki; Hiroaki Kito; Hisatsugu Goto; Masayuki Nakagawa, all of Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/808,095

(22) Filed: Mar. 15, 2001

(30) Foreign Application Priority Data

Mar. 30, 2000 (JP) ....................................... 2000-092903
Dec. 27, 2000 (JP) ....................................... 2000-396453

(51) Int. Cl.[7] ................................................ F16K 24/04
(52) U.S. Cl. .......................... 137/202; 137/43; 137/587
(58) Field of Search ........................... 137/43, 202, 587

(56) References Cited

U.S. PATENT DOCUMENTS 5,139,043 A 8/1992 Hyde et al. ................... 137/43
5,404,907 A * 4/1995 Benjey et al. .............. 137/202
6,289,915 B1 * 9/2001 Nulman et al. ............. 137/202

FOREIGN PATENT DOCUMENTS

JP 2000-008981 1/2000

* cited by examiner

*Primary Examiner*—Gerald A. Michalsky
(74) *Attorney, Agent, or Firm*—Pillsbury Winthrop LLP

(57) ABSTRACT

Provided is a fuel cutoff valve that reduces the emission of fuel vapors from within fuel tanks. The fuel cutoff valve is mounted by partial insertion into a fixation hole provided in an upper tank wall of a fuel tank. The fuel cutoff valve comprises a cover, a casing, a float, and a spring. In the cover, a matrix of polyacetal having excellent resistance to fuel permeation reduces emission of fuel vapors into the atmosphere, while a dispersed phase of polyethylene in the matrix allows welding to fuel tank.

16 Claims, 8 Drawing Sheets

52a
52
50
20
36
51a
32f
32a
32b
51
53
FTc
FTd
FTa(FT)
FT 2
FT 3
FT 1
32d
41b
32
54b
39
53a
54
54a
FL1
33
30S
46
40S
40a
33a
30a
35a
35c
35b
35

50B
53B
51B
52B
20B
56B
56Ba
56Bb
53Ba
FTa
FL1

100
114b
114
110
103d
112
114a
103b
115
FTc
FTa(FT)
FT
140
120a
112a
115a
103
103a
102
104
FL1
102S
130
120
105
105a

FUEL CUTOFF VALVE AND FUEL TANK

CROSS REFERENCE TO RELATED APPLICATIONS

This application claims the benefit of and priority from Japanese Applications No. 2000-92903 filed Mar. 30, 2000 and No. 2000-396453 filed Dec. 27, 2000, the contents of which are incorporated herein by reference.

BACKGROUND OF THE INVENTION

1. Field of the Invention

The present invention relates to a fuel cutoff valve to be mounted on an upper wall of an automobile fuel tank. The fuel cutoff valve permits an outflow of fuel vapors in the tank during refueling and, restricts the fuel outflow when the fuel reaches a predetermined level.

2. Description of Related Art

FIG. 10 shows a structure of a prior art cutoff valve. A fuel cutoff valve 100 is mounted on an upper tank wall FTa of a fuel tank FT, and comprises a casing 102, a cover 110, a float 120, and a spring 130. The casing 102 comprises a top wall 103, a side wall 104 of unitary construction having an outside edge formed of top wall 103, and a base plate 105 attached to a bottom end of the side wall 104 so as to define an internal space forming a valve chest 102S.

Within the valve chest 102S is housed the float 120 having a valve portion 120*a* in its upper portion. This valve portion 120*a* opens and closes a connecting passage 103*d* connecting to the outside of the fuel tank FT. The float 120 is supported by the spring 130 arranged on the base plate 105.

The cover 110 comprises a cover main body 112 for attaching to the casing 102, a cover passage forming portion 114, and a flange 115, these elements being of unitary construction. The cover main body 112 has a mounting recess 114*a* formed therein, and fitting into an upper welding portion 103*b* of the top wall 103 of the casing 102. An engaging protuberance 103*a* is formed at the top of the casing 102, wherein the casing 102 and the cover 110 are assembled together by engagement with an engagement hole 112*a* of a support member of the cover 110. The flange 115 is thermally welded to the upper tank wall FTa of the fuel tank FT via a joining end face 115*a*.

To mount the fuel cutoff valve 100 on the upper tank wall FTa of the fuel tank FT, the float 120 and the spring 130 are installed within the casing 102, which is then attached with the base plate 105. The casing 102 is then installed in the cover 110. Specifically, after installing an O-ring 140 in an annular recession (not shown) in the upper projecting portion 103*b* of the casing 102, the upper projecting portion 103*b* is fitted into the mounting recess 114*a* of the cover 110. The joining end face 115*a* of the flange 115 is heated with a thermal fusing plate (not shown), and the rim area of a tank fixation hole FTc of the fuel tank FT is also heated with a thermal fusing plate (not shown). The melted portions are then thermally welded together.

In the conventional art, the cover 110 and the upper tank wall Fta are both made of a polyethylene material in order to permit fusing of the cover 110 to the upper tank wall FTa. Thus, fuel vapor present within the fuel tank FT can permeate through the cover 110, albeit in small quantities, and emitted into the atmosphere. From an environmental standpoint, it is desirable to reduce such fuel vapor emissions as much as possible.

SUMMARY OF THE INVENTION

The present invention provides a fuel cutoff valve that reduces the release of fuel vapors from fuel tanks into the atmosphere.

To solve this problem, an exemplary first embodiment of the present invention provides a fuel cutoff valve that is to be partly inserted in a fixation hole formed in an upper tank wall of a fuel tank, the upper tank wall being made of a first resin material. The fuel cutoff valve comprises a cover that includes a circular welding end constructed and arranged to be thermally welded to the upper tank wall to surround a circumference of the fixation hole, and a fuel conduit that is constructed and arranged to connect to outside. The fuel cutoff valve also comprises a casing that is made of a second resin material which has a greater fuel permeation-resistant property than the first resin material, the casing including a valve chest that is constructed and arranged to connect the fuel tank to the fuel conduit. A valve body is positioned in the valve chest to open and close the fuel conduit according to a level of a liquid fuel in the fuel tank. The cover is made of a third resin material containing the first and second resin material such that the first material is dispersed in a matrix of the second resin material.

The fuel cutoff valve is mounted on the top wall of the fuel tank. When the level of fuel rises as the tank is refueled, fuel vapor present within the fuel tank flows to the outside (a canister) through a connecting passage. When the fuel in the fuel tank reaches a predetermined level, the increased buoyant force on the float causes it to rise, blocking the connecting passage and preventing the fuel from flowing out of the fuel tank.

The cover of the fuel cutoff valve is made of a matrix of a second resin having excellent resistance to permeation by fuel, and contains added thereto as a dispersed phase, the same first resin material used for the fuel tank. Since the cover is made of a matrix of the second resin, emission of fuel vapor into the atmosphere through permeation through the cover is prevented. Since the cover also contains the first resin material as a dispersed phase, the cover can be welded to the upper tank wall, which is made of the same resin material as the dispersed phase.

Thus, when the fuel cutoff valve is installed on the upper tank wall, by welding the annular welding portion of the cover to the upper tank wall, the fixation hole is blocked to seal the tank interior from the outside. Therefore, emission of fuel vapor into the atmosphere from the highly fuel permeation-resistant cover can be prevented.

In a preferred embodiment of the invention, the cover and casing are supported via a sealing member, thereby ensuring a good seal between the cover and the casing.

In another preferred embodiment, the casing is unified with the cover by means of welding. This permits dispensing of the seal member, thus reducing the number of parts required.

A second exemplary embodiment of the present invention provides a fuel cutoff valve that is to be partly inserted in a fixation hole formed in an upper tank wall of the fuel tank, the upper tank wall being made of a first resin material. The fuel cutoff valve comprises a casing that includes a tubular side wall to be inserted in the fixation hole, a top wall to be integrally formed with the side wall, and a flange formed along a periphery of the top wall so as to cover an outside periphery of the fixation hole. A fuel conduit is constructed and arranged to connect to an outside portion of the side wall and the top wall defining a valve chest. The fuel cutoff valve also comprises a float that is accommodated in the valve chest to open and close the fuel conduit according to a level of a liquid fuel in the fuel tank. The casing is made of a resin material containing the first resin material and a second resin material which has greater fuel permeation-resistant property than the first resin material. The resin material of the casing is made such that the first resin material is dispersed in a matrix of the second resin material.

The second exemplary embodiment also comprises a casing made of a cover and casing of unitary construction. The casing is made of a resin material having a matrix of the second resin material and containing the first resin material as a dispersed phase, thereby reducing the number of parts required.

In a preferred embodiment of the fuel cutoff valve, the cut off valve comprises a weld fixing member fixed to the cover, the weld fixing member being made of the first resin material and having a weld fixing end welded to the upper tank wall integrally with the annular welding end of the cover. According to this embodiment, in cases where the first resin content of the cover is held to a minimum—which has the effect of reducing bond strength with the upper tank wall—in order to ensure good resistance to fuel permeation, the weld fixing member—which is made of the same material as the upper tank wall—provides the necessary bond strength to the upper tank wall, allowing the cover to be integrally mounted onto the upper tank wall. Further, it is sufficient for the cover to bond tightly enough to the upper tank wall to control fuel permeation, so mounting strength need not be a consideration in resin material formulation. This simplifies selection of the proportions of the first resin material and second resin material and affords greater latitude as to the proportions thereof.

A third exemplary embodiment of the present invention provides a fuel cutoff valve that is to be partly inserted in a fixation hole formed in an upper tank wall of a fuel tank, the upper tank wall being made of a first resin material. Here, the fuel cutoff valve comprises a cover that includes a circular welding end that is constructed and arranged to be thermally welded to the upper tank wall to surround a circumference of the fixation hole. A fuel conduit is constructed and arranged to connect to an outside location of the fuel cutoff valve. The fuel cutoff valve also comprises a casing that is made of a second resin material, which has greater fuel permeation-resistant property than the first resin material, the casing including a valve chest that is constructed and arranged to connect the fuel tank to the fuel conduit. Also included is a valve body that is accommodated in the valve chest to open and close the fuel conduit according to a level of a liquid fuel in the fuel tank. A barrier layer is formed on a surface of the cover, the barrier layer being made of a resin material with greater fuel permeation-resistant property than the cover material.

According to the third exemplary embodiment of the present invention, the cover is made of the first resin material to assure weldability thereof to the upper tank wall, and the surface of the cover is provided with a barrier layer with excellent resistance to permeation by fuel, thereby preventing emission of fuel vapors from within the fuel tank into the atmosphere.

DETAILED DESCRIPTION OF PREFERRED EMBODIMENTS

Figure 1:
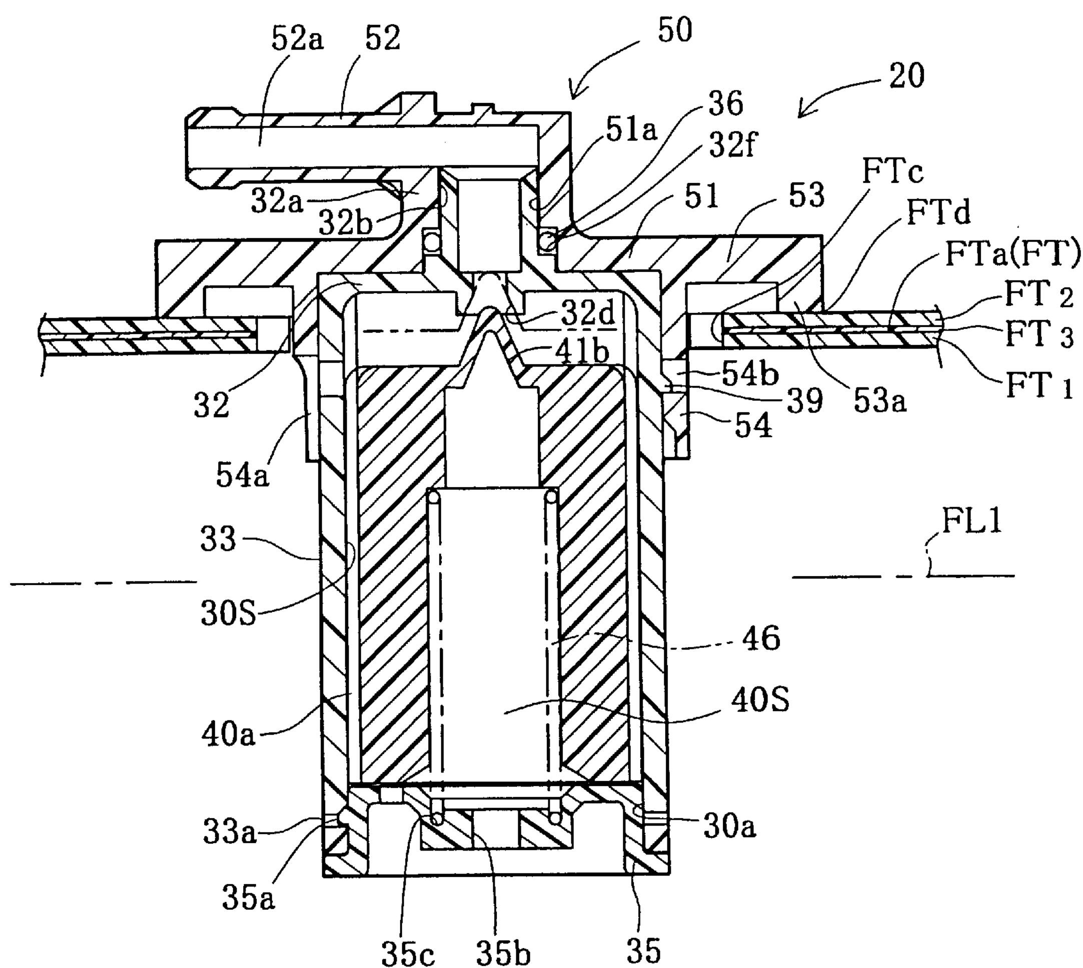
FIG. 1 is a sectional view of a fuel cutoff valve pertaining to a first embodiment of the invention, mounted on the top of an automobile fuel tank.

FIG. 1 is a sectional view of a fuel cutoff valve 20 pertaining to a first embodiment of the invention, mounted on the top of an automobile fuel tank FT. In FIG. 1, the fuel tank FT consists of three blow molded layers including surface layers made of a composite resin material that includes polyethylene. Specifically, the fuel tank is constructed of a laminate of a tank inner layer FT1, a tank outer layer FT2, and a barrier layer FT3 interposed between the tank inner layer FT1 and the tank outer layer FT2. The tank inner layer FT1 and the tank outer layer FT2 are formed of polyethylene, and function primarily as structural materials for ensuring that the fuel tank has adequate mechanical strength. The barrier layer FT3 is formed from fuel permeation resistant ethylene vinyl alcohol (EVOH) or polyamide (PA), and functions as a barrier material for preventing passage of fuel vapors.

The upper tank wall FTa is provided with a fixation hole FTc. The fuel cutoff valve 20 is mounted on the upper tank wall FTa by inserting a lower portion of the fuel cutoff valve into the fixation hole FTc. The fuel cutoff valve 20 is constructed to check outflow of fuel to the outside (canister) when the fuel in the fuel tank FT has reached a predetermined level FL1 during refueling.

Figure 2:
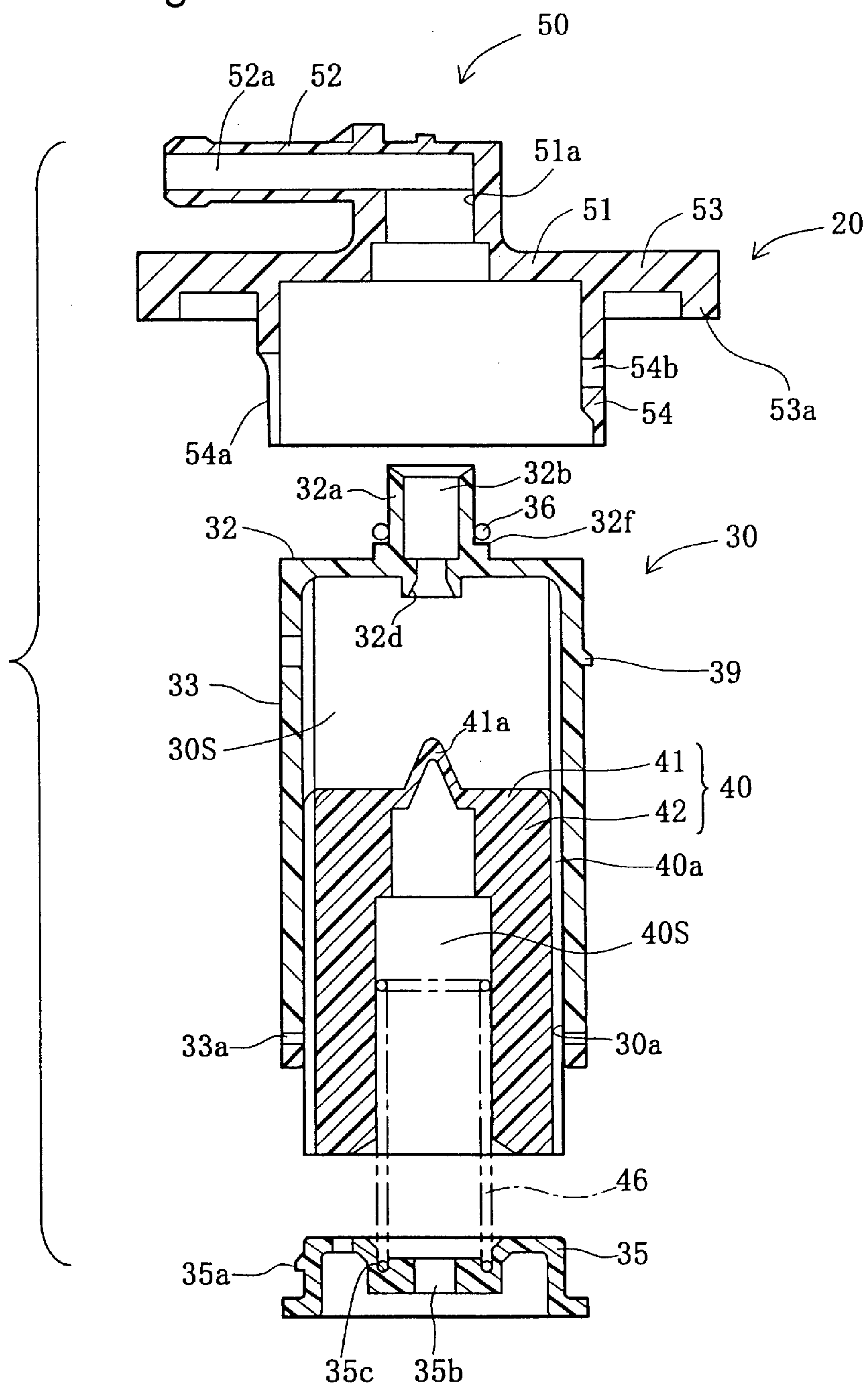
FIG. 2 is a sectional exploded view of the fuel cutoff valve.

FIG. 2 is a sectional exploded view of the fuel cutoff valve 20. The fuel cutoff valve 20 comprises the principal elements of a casing 30, a base plate 35, a float 40, a spring 46, and a cover 50. The casing 30, the base plate 35, and the float 40 are made of polyacetal synthetic resin, which has excellent resistance to fuel permeation and resistance to fuel oil. The cover member 50 is made of a matrix of polyacetal synthetic resin having excellent resistance to fuel permeation (second resin material) in which is admixed a dispersed phase of polyethylene (first resin material). The dispersed phase is made of the same polyethylene material as the fuel tank FT, and is utilized for welding.

The casing 30 comprises a top wall 32 and a side wall 33 that extends in a tubular configuration downward from the top wall 32 so as to define a valve chest 30S a of cup configuration enclosed by the top wall 32 and side wall 33. The bottom of the casing 30 forms a bottom opening 30*a*. In the center of the top wall 32 of the casing 30 there is formed an upper projecting portion 32*a*. The upper projecting portion 32*a* is perforated by a connecting passage 32*b*, with the valve chest 30S end of the connecting passage 32*b* forming a conical seat portion 32*d*. An annular step 32*f* for supporting an O-ring 36 is formed on an outside peripheral side wall of the upper projecting portion 32*a*. An engagement hole 33*a* is formed in the base of the side wall 33. This engagement hole 33*a* is used for mounting the base plate 35, described later.

The base plate 35 provides closure to the bottom opening 30*a* of the casing 30, and by engaging an engagement portion 35*a* formed on the outside periphery thereof in the engagement hole 33*a*, it may be attached so as to provide closure to the bottom opening 30*a* of the casing 30. In the center of the base plate 35 is formed a through-hole 35*b* through which the valve chest 30S communicates with an interior of the fuel tank FT. An interior of the fuel tank FT therefore communicates with the valve chest 30S via the through-hole 35*b*. An annular spring support portion 35*c* is formed on the central upper portion of the base plate 35. This spring support portion 35*c* supports the spring 46 between itself and an inside bottom surface of the float 40.

The float 40 housed within the valve chest 30S comprises a top wall 41 and a tubular side wall 42 extending downward from an outside edge of the top wall 41 to define a cup-shaped configuration. An interior space thereof serves as a buoyancy chamber 40S for producing buoyancy. A guide rib 40*a* is formed along the outside periphery of the float 40 and is guided by an inside wall of the casing 30.

The cover 50 comprises a cover main body 51, a tube member 52 projected in an "L" configuration from the center of the top of the cover main body 51, a flange 53 formed on an outside periphery of the cover main body 51, and a mating portion 54 projecting from the bottom of the cover main body 51, these elements being of unitary construction. In the center of the bottom of the cover main body 51 is formed a cover mating portion 51*a* for mating with the upper projecting portion 32*a* of the casing 30. The tube member 52 has formed therein a cover passage 52*a*, a first end of the cover passage 52*a* being connected to the connecting passage 32*b* of the casing 30 and a second end thereof being connected to the canister. At a bottom edge of the flange 53 is formed an annular welding portion 53*a* for welding to the upper tank wall FTa of the fuel tank FT. The mating portion 54 projects in a tubular configuration so as to mate with the top of the casing 30, and is provided in a portion thereof with a slit 54*a* and an engagement hole 54*b* leading into a bottom end thereof.

The procedure for installing the fuel cutoff valve 20 on the upper tank wall FTa of the fuel tank FT is now described. Referring to FIG. 2, the float 40 and the spring 46 are housed within the valve chest 30S of the casing 30, with a bottom end of the spring 46 arranged on the spring support portion 35*c* of the base plate 35 and the engagement portion 35*a* of the base plate 35 engaged within the engagement hole 33*a* of the side wall 33 to attach the base plate 35 to the casing 30. With the O-ring 36 fitted over the upper projecting portion 32*a* and held on the annular step 32*f*, the mating portion 54 is fitted onto the top of the casing 30, with the upper projecting portion 32*a* mating with the cover mating portion 51*a*. An engagement protuberance 39 is engaged within the engagement hole 54*b* whereby the cover 50 and the casing 30 are assembled into a unified unit.

The bottom end of the annular welding portion 53*a* of the cover 50 is then melted with a hot plate (not shown), and the rim of the fixation hole FTc of the fuel tank FT is melted with a hot plate (not shown) to produce a weld portion FTd (see FIG. 1). The casing 30 is then inserted bottom first into the fixation hole FTc, and the annular welding portion 53*a* is forced against the weld portion FTd. Since the cover 50 contains a polyethylene dispersed phase which is the same resin material as that of the tank outer layer FT2 of the fuel tank, the annular welding portion 53*a* and the weld portion FTd weld together upon cooling and hardening. By welding the cover 50 to the upper tank wall FTa in this way, a good seal between the fuel tank FT interior and the outside is provided.

Operation of the fuel cutoff valve 20 is now described. When fuel is supplied to the fuel tank FT during a fueling operation, the fuel level within the fuel tank FT rises, causing fuel vapor that has collected in the top of the fuel tank FT to escape to the canister via the connecting passage 32*b*. When the fuel level within the fuel tank FT reaches a predetermined fuel level FL1, fuel flows into the valve chest 30S via the through-hole 35*b* in base plate 35. This causes the float 40 to rise through buoyant force, whereby a valve portion 41*a* blocks off the connecting passage 32*b* so as to prevent outflow of fuel to the canister. Thus, during the process of fueling the fuel tank FT, the fuel cutoff valve 20 prevents escape of fuel vapor from the fuel tank FT while also preventing fuel from flowing out from the fuel tank FT.

Figure 3:
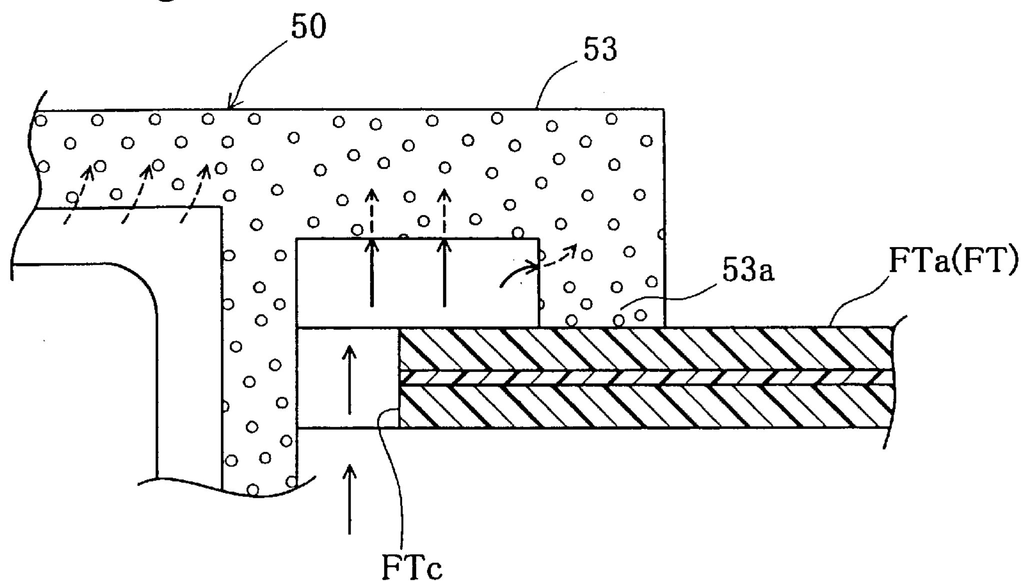
FIG. 3 is an illustrative diagram depicting the action of the cover in preventing release of fuel vapor into the atmosphere.

FIG. 3 is an illustrative diagram depicting the manner in which fuel vapors are prevented by the cover 50 from being released into the atmosphere. The material structure of the cover 50 is depicted in model form in FIG. 3, and may be seen to consist of a dispersed phase in the form of grain-like islands distributed throughout the matrix. Since the matrix of the cover 50 consists of fuel permeation resistant polyacetal, release of fuel vapors present in the fuel tank FT into the atmosphere through the cover 50 is prevented. Since the cover 50 contains a dispersed phase of polyethylene, which is the same material of which the fuel tank FT is fabricated, it can be thermally welded to the upper tank wall FTa.

Accordingly, when mounting the fuel cutoff valve 20 on the upper tank wall FTa, by welding the annular welding portion 53*a* to the upper tank wall FTa, the fixation hole FTc is provided with closure, sealing the interior of the fuel tank FT from the outside and preventing the release of fuel vapor into the atmosphere.

Figure 4:
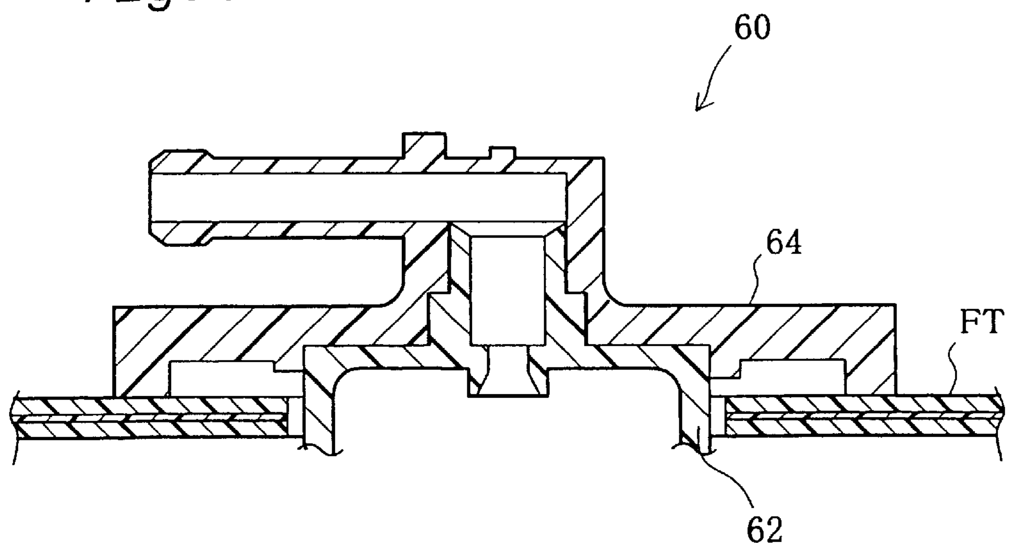
FIG. 4 is a sectional view depicting a fuel cutoff valve according to a second embodiment.

FIG. 4 is a sectional view depicting a fuel cutoff valve 60 according to a second embodiment. The fuel cutoff valve 60 of this embodiment comprises a casing 62 and a cover 64 fabricated of the same material and welded together. Specifically, the casing 62 and the cover 64 are made of a polyacetal matrix having dispersed therein a dispersed phase of polyethylene. The cover 64 is thermally welded to the fuel tank FT in the same manner as in the first embodiment, and is also weldable to the casing 62 since the cover 64 and casing 62 consist of the same resin material having a polyacetal matrix. Since the casing 62 and the cover 64 are unified to be thermally welded, the O-ring 36 employed in the first embodiment may be dispensed with, thus reducing the number of parts required.

Figure 5:
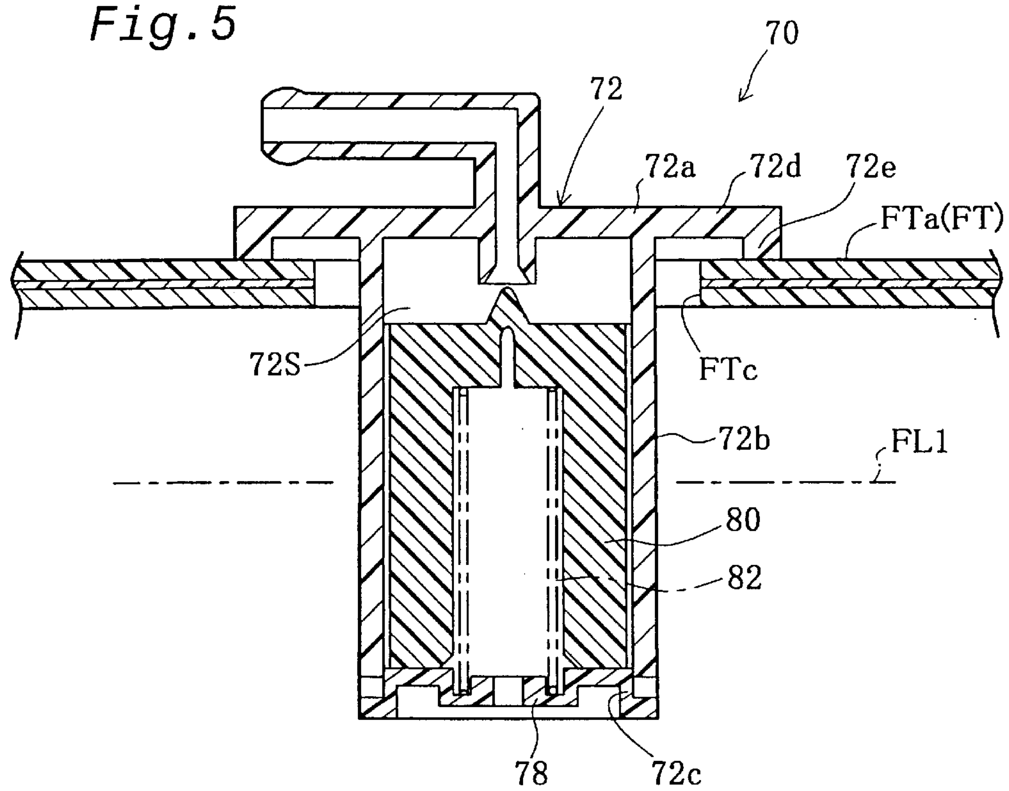
FIG. 5 is a sectional view depicting a fuel cutoff valve according to a third embodiment.

FIG. 5 is a sectional view depicting a fuel cutoff valve 70 according to a third embodiment. The fuel cutoff valve 70 of this embodiment comprises a casing 72 composed of an integrally formed cover and casing. The fuel cutoff valve 70 comprises the principal elements of the casing 72, a base plate 78, a float 80, and a springs. The casing 72 comprises a top wall 72*a* and a side wall 72*b* that extends in a tubular configuration downward from the top wall 72*a* so as to define a valve chest 72S of a cup configuration enclosed by the top wall 72*a* and the side wall 72*b*. The bottom of the casing 72 forms a bottom opening 72*c*. An outside edge of the top wall 72*a* forms a disk-shaped flange 72*d* of greater outside diameter than the side wall 72*b*, this portion representing the cover. An annular welding portion 72*e* is provided along an outside bottom edge of the flange 72*d*.

The casing 72 is made of a resin material having a fuel permeation-resistant polyacetal matrix containing a polyethylene dispersed phase. Thus, by welding the annular welding portion 72*e* to the upper tank wall FTa of the fuel tank FT, the fuel cutoff valve 70 may be mounted on the fuel tank FT, while simultaneously sealing the interior of the fuel tank FT from the outside. Since the casing 72 is composed of a cover and casing of unitary structure, the number of parts required may be reduced.

Figure 6:
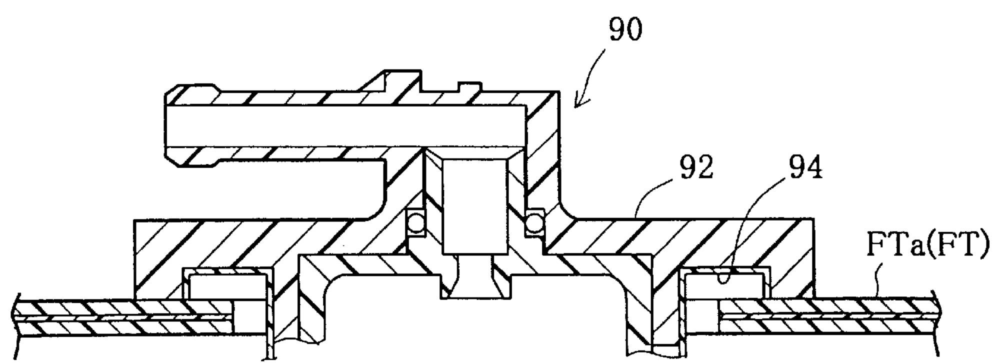
FIG. 6 is a sectional view depicting a fuel cutoff valve according to a fourth embodiment.

FIG. 6 is a sectional view depicting a fuel cutoff valve 90 according to a fourth embodiment. The fuel cutoff valve 90 of this embodiment features a coating film 94 provided to the surface of an inside wall of a cover 92. The coating film serves as a barrier layer. The cover 92 is made of polyethylene, assuring weldability thereof to the upper tank wall FTa, and the surface of the cover 92 is provided with the coating film 94 having excellent resistance to fuel permeation, thereby preventing release of fuel vapors in the fuel tank FT into the atmosphere.

An exemplary method for providing the coating film 94 on the surface of cover 92 involves applying a primer (water or an alcohol mixture) and then applying an aqueous solution (or alcohol solution) of EVOH, polyvinyl acetate (PVA), or polyamide. According to this embodiment, improved resistance to fuel permeation can be achieved without modifying the existing cover 92 configuration.

Another method involves sheathing the cover 92 with EVOH, PVA, or polyamide as a barrier layer by injection molding. This method obviates the need for an additional coating process to produce the barrier layer, and provides a more even barrier layer.

Figure 7:
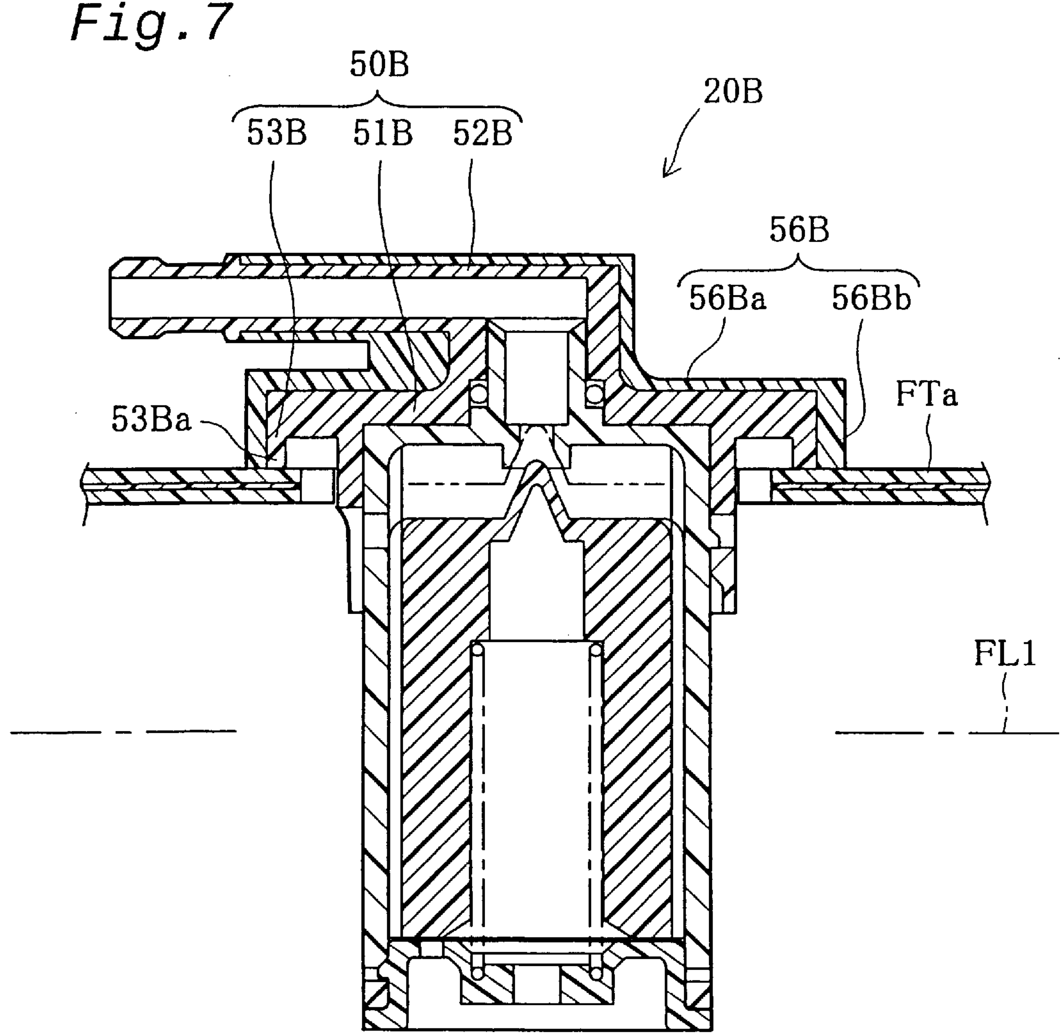
FIG. 7 is a sectional view depicting a fuel cutoff valve according to a fifth embodiment.

FIG. 7 is a sectional view depicting a fuel cutoff valve 20B according to a fifth embodiment. The fuel cutoff valve 20B of this embodiment features a weld fixing member 56B provided on the outside face of a cover 50B. The cover 50B is made of a resin material consisting of a fuel permeation-resistant polyacetal matrix having dispersed therein a dispersed phase of polyethylene, and has integrated with the outside face thereof a weld fixing member 56B formed of polyethylene. The weld fixing member 56B is integrally molded with an upper fixing member 56Ba that covers an areas extending from a top 51B of the cover 50B to a tube member 52B, and the weld fixing end 56Bb covering the outside of a flange 53B and intended for welding to the upper tank wall FTa. The weld fixing member 56B is made of the same polyethylene (first resin material) as the upper tank wall FTa. Integral forming of the weld fixing member 56B and the cover 50B may be accomplished by integral molding techniques such as two-color injection molding, or by mating a separately molded welding fixing member 56B with the cover 50B.

The fuel cutoff valve 20B is attached to the upper tank wall FTa in the same manner as an annular weld portion 53Ba of the cover 50B, namely, by melting the weld fixing end 56Bb of the weld fixing member 56B with a hot plate and welding it to the upper tank wall FTa simultaneously with the annular weld portion 53Ba.

The weld fixing member 56B described hereinabove offers the following advantages.

(1) Depending on the compounding proportions for the material of cover 50B, namely, the proportions of the first resin material and the second resin material, it may occur that fuel permeability increases or an adequate level of strength is not achieved. In cases where the first resin content of the cover 50B is held to a minimum in order to ensure good resistance to fuel permeation, resulting in reducing bond strength to the upper tank wall FTa, the weld fixing member 56B, which is made of the same material as the upper tank wall FTa, provides the necessary bond strength to the upper tank wall FTa, allowing the cover 50B to be integrally mounted onto the upper tank wall FTa.

(2) It is sufficient for the cover 50B to bond tightly enough to the upper tank wall FTa to control fuel permeation, so mounting strength need not be a consideration in resin material formulation. This simplifies selection of the proportions of the first resin material and second resin material and affords greater latitude as to the proportions thereof.

(3) Since the weld fixing member 56B may be integrally formed with the cover 50B by means of two-color injection molding or the like, it can be fixed by welding to the upper tank wall FTa at the same time as the cover 50B, facilitating the mounting procedure.

(4) Since the cover 50B is a composite material, it is susceptible to depressed mechanical strength and increased cost, but since reinforcement is provided by the weld fixing member 56B, the amount of material needed for the cover 50B—which tends to become expensive due to the need to compound resins—can be reduced.

Figure 8:
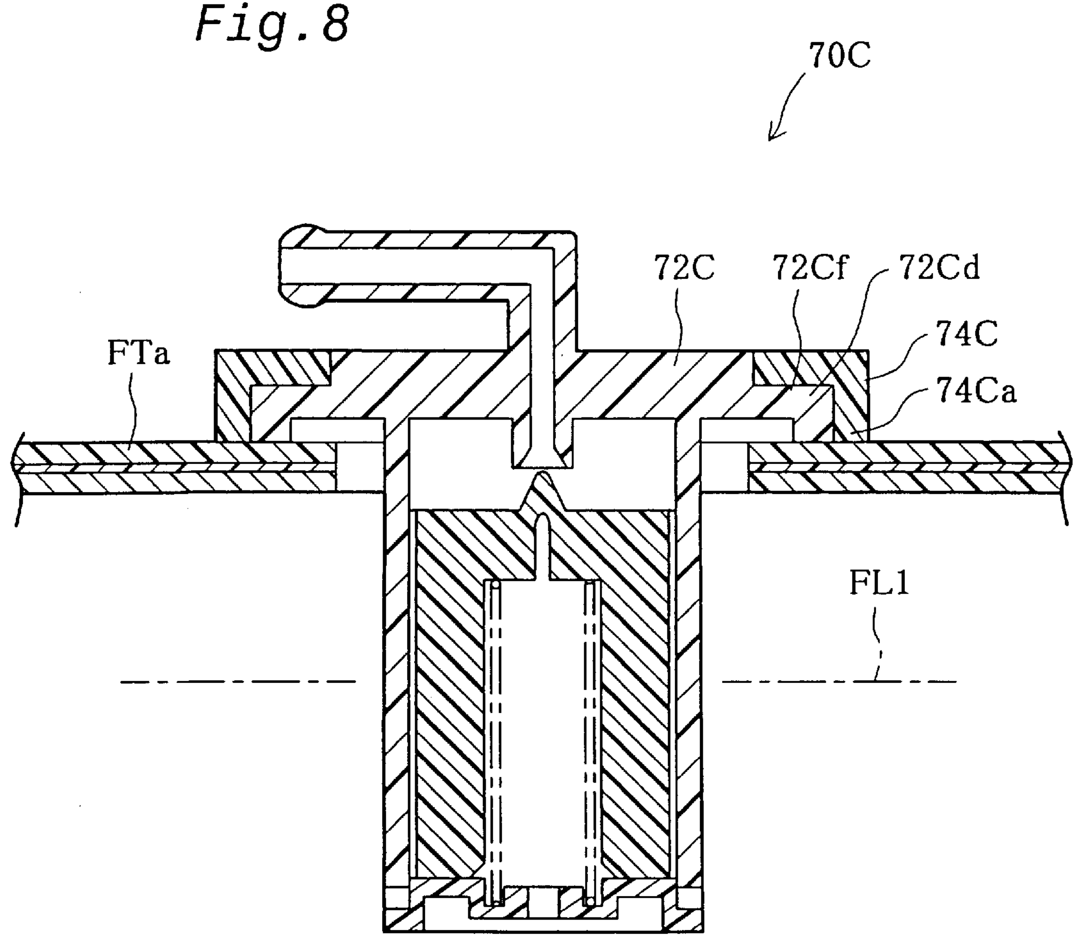
FIG. 8 is a sectional view depicting a fuel cutoff valve according to a sixth embodiment.

FIG. 8 is a sectional view depicting a fuel cutoff valve 70C according to a sixth embodiment. The fuel cutoff valve 70C of this embodiment is a modification of the fuel cutoff valve 70 depicted in FIG. 5, and is provided with a casing 72C comprising an integrally formed cover and casing, and made of a resin material consisting of a fuel permeation-resistant polyacetal matrix having dispersed therein a dispersed phase of polyethylene, and also having a weld fixing member 74C unified with a corresponding flange 72Cd. Specifically, a step portion 72Cf is formed at the top of the flange 72Cd, and the weld fixing member 74C is unified therewith so as to mate with the step portion 72Cf. The weld fixing member 74C is formed from polyethylene (first resin material), and weld fixing end 74Ca at the bottom end thereof is welded to the upper tank wall FTa. In this way the weld fixing member 74C is of unitary construction with the casing 72C and may be welded to the upper tank wall FTa.

Figure 9:
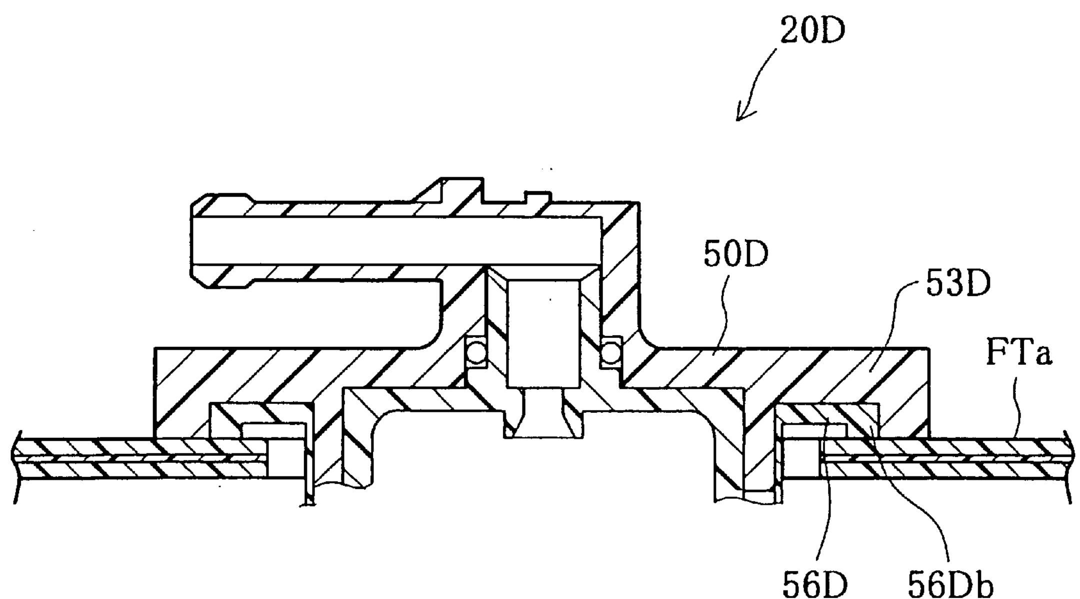
FIG. 9 is a sectional view depicting the top portion of a fuel cutoff valve according to a seventh embodiment.
Figure 10:
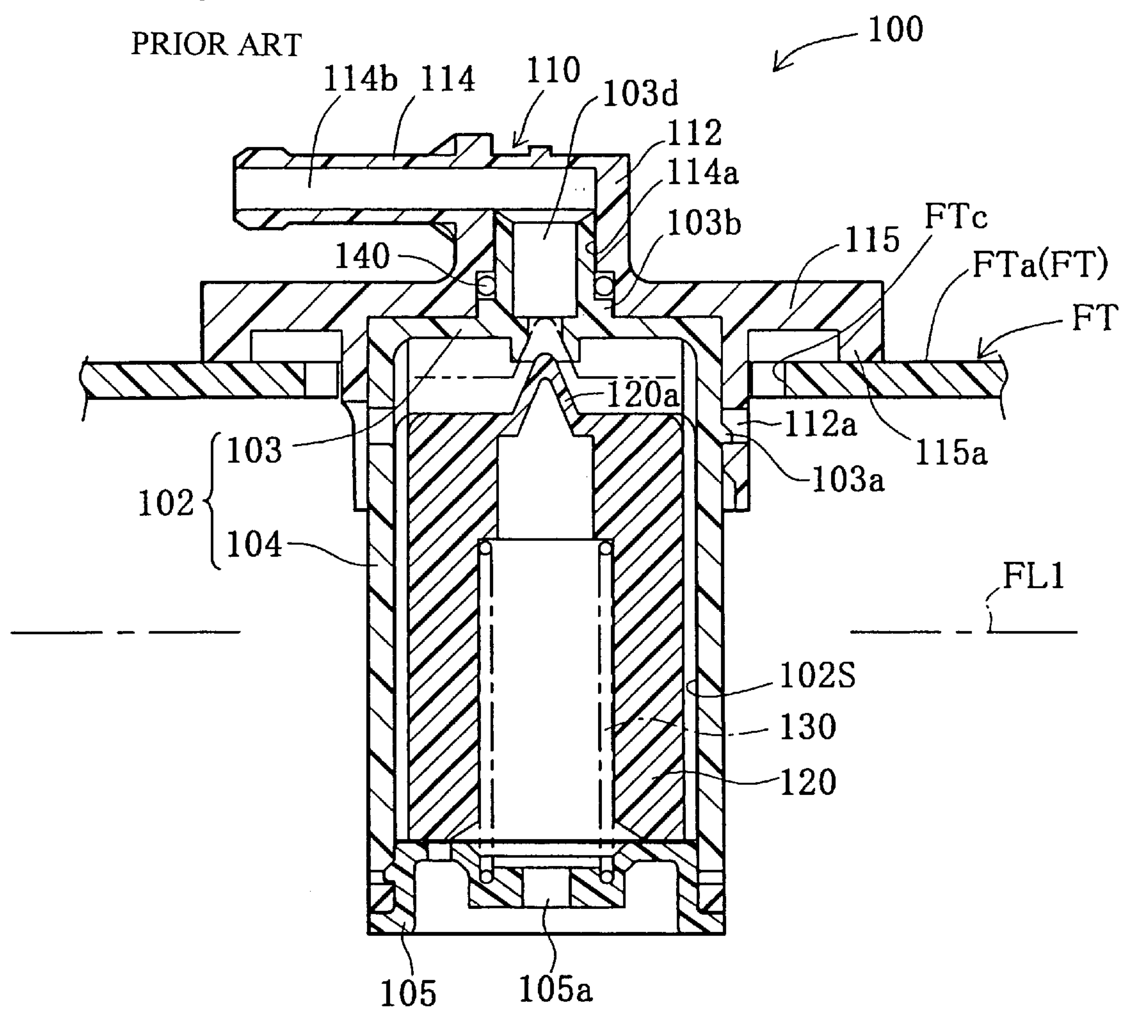
FIG. 10 is a sectional view depicting a prior art fuel cutoff valve.

FIG. 9 is a sectional view depicting the top portion of a fuel cutoff valve 20D according to a seventh embodiment. An integral weld fixing member 56D is located inside a flange 53D of a cover 50D. This weld fixing member 56D is formed from polyethylene and is welded to the upper tank wall FTa by its weld fixing end 56Db. With this arrangement the placement of the weld fixing member 56D is not limited provided that the location allows the cover 50D to be molded to the upper tank wall FTa. Since the weld fixing member 56D has greater fuel swell volume than the cover 50D, the fuel swelling increases the joining force with the cover 50D, allowing the cover 50D to be securely mounted on the upper tank wall FTa.

The embodiments set forth hereinabove are not limiting of the invention, with various modifications thereof being possible without departing from the spirit of the invention, such as the following.

(1) While the preceding embodiments employ polyethylene as the resin material for the dispersed phase in the cover, the invention is not limited thereto and permits selection of various other resin materials suitable as resin materials for the fuel tank. Added amounts will be determined with reference to fuel permeation resistance and the mechanical strength of the weld between the cover and the fuel tank.

(2) In the preceding embodiments, thermal welding is employed as the method for joining the cover and the fuel tank, but the invention is not limited thereto, it being possible to employ ultrasonic welding as the joining method.

(3) While in preferred practice the resin material used as the matrix in the cover and casing will be polyacetal or polyamide (since these offer an excellent balance of mechanical strength with fuel barrier properties), any resin material having fuel barrier properties and capable of having a first resin such as polyethylene dispersed therein may be used. Examples are EVOH and polyvinyl acetate.

(4) While polyethylene is used as the material for the weld fixing members in the preceding description, bonding to the cover may be enhanced while maintaining the same level of bonding to the resin tank by employing polyethylene with improved adhesion through modification with maleic acid or the like.

What is claimed is:

1. A fuel cutoff valve configured for partial insertion into a fixation hole formed in an upper tank wall of a fuel tank, the upper tank wall being made of a first resin material, the fuel cutoff valve comprising:

a cover including (i) a circular welding end, the cover being constructed and arranged to be thermally welded to the upper tank wall to surround a peripheral portion of the fixation hole and (ii) a fuel conduit constructed and arranged to connect to a location exterior to the cover;

a casing constructed of a second resin material having a greater fuel permeation-resistant property than the first resin material, the casing including a valve chest constructed and arranged to connect the fuel tank to the fuel conduit; and a valve body positioned in the valve chest to open and close the fuel conduit according to a level of a liquid fuel in the fuel tank;

wherein the cover is constructed of a third resin material, the third resin material containing the first and second resin material such that the first material is dispersed a matrix of the second resin material.

2. The fuel cutoff valve of claim 1, further comprising a seal member, the seal member being held between the casing and the cover to seal the fuel conduit.

3. The fuel cutoff valve of claim 1, wherein the casing is unitarily formed with the cover by welding.

4. The fuel cutoff valve of claim 1, wherein the first resin material is polyethylene and the second resin material is selected from the group of polyacetal and polyamide.

5. A fuel cutoff valve configured for partial insertion into a fixation hole formed in an upper tank wall of a fuel tank, the upper tank wall being made of a first resin material, the fuel cutoff valve comprising:

a casing including (i) a tubular side wall configured for insertion into the fixation hole, (ii) a top wall adapted to be integrally formed with the side wall, a flange being formed along a periphery of the top wall so as to cover an outside periphery of the fixation hole, and (iii) a fuel conduit constructed and arranged to connect outside of the casing, the side wall and the top wall defining a valve chest; and a float positioned in the valve chest to open and close the fuel conduit according to a level of a liquid fuel in the fuel tank;

wherein the casing is constructed of a resin material containing the first resin material and a second resin material having a greater fuel permeation-resistant property than the first resin material, the resin material of the casing being made such that the first resin material is dispersed in a matrix of the second resin material.

6. The fuel cutoff valve of claim 5, wherein the first resin material is polyethylene and the second resin material is selected from the group of polyacetal and polyamide.

7. A fuel cutoff valve configured for partial insertion into a fixation hole formed in an upper tank wall of a fuel tank, the upper tank wall being made of a first resin material, the fuel cutoff valve comprising:

a cover constructed of a resin material having the first resin material and a second resin material having a greater fuel permeation-resistant property than the first resin material, the second resin material forming a matrix, and the first material being dispersed in the matrix of the second resin material, the cover including (i) a circular welding end constructed and arranged to be thermally welded to the upper tank wall to surround a peripheral portion of the fixation hole, and (ii) a fuel conduit constructed and arranged to connect the tank to a location exterior to the cover;

a casing constructed of the second resin material, the casing including a valve chest constructed and arranged to connect the fuel tank to the fuel conduit;

a valve body positioned in the valve chest to open and close the fuel conduit according to a level of a liquid fuel in the fuel tank; and a weld fixing member fixed to the cover, the weld fixing member being made of the first resin material and having a weld fixing end welded to the upper tank wall integrally with the annular welding end of the cover.

8. The fuel cutoff valve of claim 7, further comprising a seal member, the seal member being held between the casing and the cover to seal the fuel conduit.

9. The fuel cutoff valve of claim 7, wherein the casing is unitarily formed with the cover by welding.

10. The fuel cutoff valve of claim 7, wherein the first resin material is polyethylene and the second resin material is selected from the group of polyacetal and polyamide.

11. A fuel cutoff valve configured for partial insertion into a fixation hole formed in an upper tank wall of a fuel tank, the upper tank wall being made of a first resin material, the fuel cutoff valve comprising:

a casing including (i) a tubular side wall configured for insertion into the fixation hole, (ii) a top wall adapted to be integrally formed with the side wall, a flange being formed along an outside periphery of the top wall so as to cover an outside periphery of the fixation hole, and (iii) a fuel conduit constructed and arranged to connect to a location exterior to the casing, the side wall and the top wall defining a valve chest;

a float positioned in the valve chest to open and close the fuel conduit according to a level of a liquid fuel in the fuel tank; and a weld fixing member unitarily attached to the cover, the weld fixing member being made of the first resin material and having a weld fixing end welded to the upper tank wall integrally with the annular welding, wherein the casing is constructed of a resin material containing the first resin material and a second resin material having greater fuel permeation-resistant property than the first resin material, the second resin material forming a matrix, the first resin material being dispersed in the matrix of the second resin material.

12. The fuel cutoff valve of claim 11, wherein the first resin material is polyethylene and the second resin material is selected from the group of polyacetal and polyamide.

13. A fuel cutoff valve configured for partial insertion into a fixation hole formed in an upper tank wall of a fuel tank, the upper tank wall being made of a first resin material, the fuel cutoff valve comprising:

a cover including (i) a circular welding end, the cover being constructed and arranged to be thermally welded to the upper tank wall to surround a peripheral portion of the fixation hole and (ii) a fuel conduit constructed and arranged to connect to a location exterior to the cover;

a casing constructed of a second resin material having a greater fuel permeation-resistant property than the first resin material, the casing including a valve chest constructed and arranged to connect the fuel tank to the fuel conduit;

a valve body positioned in the valve chest to open and close the fuel conduit according to a level of a liquid fuel in the fuel tank; and a barrier layer formed on a surface of the cover, the barrier layer being made of a resin material having a greater fuel permeation-resistant property than the cover material.

14. The fuel cutoff valve of claim 13, wherein the first resin material is polyethylene and the second resin material is selected from the group of polyacetal and polyamide.

15. A fuel tank comprising a resin upper tank wall constructed of a first resin material and having a fixation hole and a fuel cutoff valve configured to be mounted on the upper tank wall by insertion thereof partway into the fixation hole, the fuel cutoff valve comprising:

a cover thermally welded to the upper tank wall, the cover including (i) a circular welding end constructed and arranged to be thermally welded to the upper tank wall to surround a peripheral portion of the fixation hole, and (ii) a fuel conduit constructed and arranged to connect to a location exterior to the cover;

a casing constructed of a second resin material having a smaller fuel swelling property than the first resin material, the casing including a valve chest constructed and arranged to connect the fuel tank to the fuel conduit; and a valve body positioned in the valve chest to open and close the fuel conduit according to a level of a liquid fuel in the fuel tank;

wherein the cover is constructed of a third resin material, the third resin material containing the first and second resin material such that the first resin material is dispersed in a matrix of the second resin material.

16. The fuel cutoff valve of claim 15, wherein the first resin material is polyethylene and the second resin material is selected from the group of polyacetal and polyamide.

* * * * *